(12) United States Patent
Padhy et al.

(10) Patent No.: US 11,109,284 B2
(45) Date of Patent: Aug. 31, 2021

(54) CONTROLLING HANDOVER BASED ON NETWORK SLICES SUPPORTED BY BASE STATION

(71) Applicant: NOKIA SOLUTIONS AND NETWORKS OY, Espoo (FI)

(72) Inventors: Manasi Padhy, Kamataka (IN); Saubhagya Baliarsingh, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/922,501

(22) Filed: Jul. 7, 2020

(65) Prior Publication Data

US 2021/0014745 A1    Jan. 14, 2021

(30) Foreign Application Priority Data

Jul. 12, 2019   (FI) .................................... 20195637

(51) Int. Cl.
*H04W 36/00*      (2009.01)
*H04W 48/18*      (2009.01)

(52) U.S. Cl.
CPC ... *H04W 36/0058* (2018.08); *H04W 36/0094* (2013.01); *H04W 36/00835* (2018.08); *H04W 36/00837* (2018.08); *H04W 48/18* (2013.01)

(58) Field of Classification Search
CPC ............. H04W 36/0058; H04W 48/18; H04W 36/0094; H04W 36/00837; H04W 36/00835

See application file for complete search history.

(56) References Cited

U.S. PATENT DOCUMENTS

| 2013/0072202 | A1  | 3/2013  | Nakamura et al. |             |
|--------------|-----|---------|-----------------|-------------|
| 2017/0086118 | A1* | 3/2017  | Vrzic ...................   | H04W 36/26  |
| 2018/0124661 | A1* | 5/2018  | Tsai .......................  | H04W 36/06  |
| 2018/0324645 | A1* | 11/2018 | Park .....................   | H04W 76/18  |

(Continued)

FOREIGN PATENT DOCUMENTS

| GB | 2552844 A    | 2/2018 |
| WO | 2018074953 A1 | 4/2018 |

(Continued)

OTHER PUBLICATIONS

Finnish Search Report dated Nov. 7, 2019 corresponding to Finnish Patent Application No. 20195637.

(Continued)

*Primary Examiner* — Ivan O LaTorre (74) *Attorney, Agent, or Firm* — Squire Patton Boggs (US) LLP (57) ABSTRACT

Apparatus and method for controlling handover are disclosed. The solution comprises obtaining information on slices supported by surrounding base stations; obtaining information on overloaded slices used by the surrounding base stations; receiving a measurement report from a user terminal utilizing slices in communication; determining based on the measurement report that a handover is needed for the user terminal; selecting from the surrounding base stations a target base station for handover based on the measurement report, slices supported by the base stations and the information on overloaded slices.

6 Claims, 4 Drawing Sheets

(56) References Cited

U.S. PATENT DOCUMENTS

2018/0324663 A1* 11/2018 Park ................. H04W 36/08
2018/0352491 A1* 12/2018 Shih ............... H04W 36/0069
2019/0281494 A1*  9/2019 Chan ................ H04W 48/06
2020/0022061 A1*  1/2020 Jin ................. H04W 28/0268
2020/0068430 A1*  2/2020 Chan ................ H04W 24/08

FOREIGN PATENT DOCUMENTS

WO    WO 2018/228480 A1   12/2018
WO    WO 2019/110014 A1    6/2019

OTHER PUBLICATIONS

Office Action dated Nov. 7, 2019 corresponding to Finnish Patent Application No. 20195637.
Communication of Acceptance under section 29a of Patents Decree dated May 26, 2020 corresponding to Finnish Patent Application No. 20195637.
Partial European Search Report corresponding to EP Appln. No. 20183908.1, dated Dec. 10, 2020.
Extended European Search Report corresponding to EP Application No. 20183908.1, dated Jul. 5, 2021.

* cited by examiner

CONTROLLING HANDOVER BASED ON NETWORK SLICES SUPPORTED BY BASE STATION

TECHNICAL FIELD

The exemplary and non-limiting embodiments of the invention relate generally to communications.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

In communication systems, and communication systems supporting multiple access nodes or base stations in particular, handover is one of the key procedures carried out for mobility while in connected. In many systems, handover procedure of a user terminal is initiated based on the measurement report received from user terminal when a reference signal received power level from a nearby node is better than the reference signal received power level from the serving node. Source node initiates handover request to target node and upon successful handover, the communication link or links are transferred to the target node.

Developing networks enable new services to customers. One suggested service is Network Slicing, which enables offering connectivity, quality of service and data processing solutions tailored to specific customers' requirements. A network slice is a logical end-to-end virtual network that can be dynamically created and that provides specific capabilities and characteristics.

User terminals may utilise one or more slices in communication. To ensure smooth handovers and efficient mobility between the nodes slices should be taken into account.

BRIEF DESCRIPTION

According to an aspect of the present invention, there is provided an apparatus in a communication system, the apparatus comprising at least one processor; at least one memory including computer program code; the at least one memory and the computer program code configured to, with the at least one processor, cause the apparatus at least to perform: obtain information on slices supported by surrounding base stations; obtain information on overloaded slices used by the surrounding base stations; receive a measurement report from a user terminal utilizing slices in communication; determine based on the measurement report that a handover is needed for the user terminal; select from the surrounding base stations a target base station for handover based on the measurement report, slices supported by the base stations and the information on overloaded slices, wherein if in the surrounding base stations more than one is acceptable based on the measurement report, select as a target base station the base station offering maximum number of non-overloaded slices required by the user terminal.

According to an aspect of the present invention, there is provided an apparatus in a communication system, the apparatus comprising at least one processor; at least one memory including computer program code; the at least one memory and the computer program code configured to, with the at least one processor, cause the apparatus at least to perform: determine the resource availability of the slices the apparatus is supporting; indicate to surrounding base stations if one or more slices have load exceeding a given first overload limit; and indicate to surrounding base stations if one or more slices that previously had load exceeding a given overload limit has load fallen below a given second overload limit.

According to an aspect of the present invention, there is provided a method in a communication system, comprising: obtaining information on slices supported by surrounding base stations; obtaining information on overloaded slices used by the surrounding base stations; receiving a measurement report from a user terminal utilizing slices in communication; determining based on the measurement report that a handover is needed for the user terminal; selecting from the surrounding base stations a target base station for handover based on the measurement report, slices supported by the base stations and the information on overloaded slices, wherein if in the surrounding base stations more than one is acceptable based on the measurement report, select as a target base station the base station offering maximum number of non-overloaded slices required by the user terminal.

According to an aspect of the present invention, there is provided a method in a communication system, comprising: determining the resource availability of supported slices; indicating to surrounding base stations if one or more slices have load exceeding a given first overload limit; and indicating to surrounding base stations if one or more slices that previously had load exceeding a given overload limit has load fallen below a given second overload limit.

According to an aspect of the present invention, there is provided a computer program comprising instructions for causing an apparatus of a communication system to perform at least the following: obtaining information on slices supported by surrounding base stations; obtaining information on overloaded slices used by the surrounding base stations; receiving a measurement report from a user terminal utilizing slices in communication; determining based on the measurement report that a handover is needed for the user terminal; selecting from the surrounding base stations a target base station for handover based on the measurement report, slices supported by the base stations and the information on overloaded slices, wherein if in the surrounding base stations more than one is acceptable based on the measurement report, select as a target base station the base station offering maximum number of non-overloaded slices required by the user terminal.

According to an aspect of the present invention, there is provided a computer program comprising instructions for causing an apparatus of a communication system to perform at least the following: determining the resource availability of supported slices; indicating to surrounding base stations if one or more slices have load exceeding a given first overload limit; and indicating to surrounding base stations if one or more slices that previously had load exceeding a given overload limit has load fallen below a given second overload limit.

The scope of protection sought for various embodiments of the invention is set out by the independent claims.

The embodiments and or examples and features, if any, described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the accompanying drawings, in which.

DETAILED DESCRIPTION OF SOME EMBODIMENTS

In the following, different exemplifying embodiments will be described using, as an example an access architecture to which the embodiments may be applied, a radio access architecture based on long term evolution advanced (LTE Advanced, LTE-A), enhanced LTE (eLTE), or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), or any combination thereof.

Figure 1:
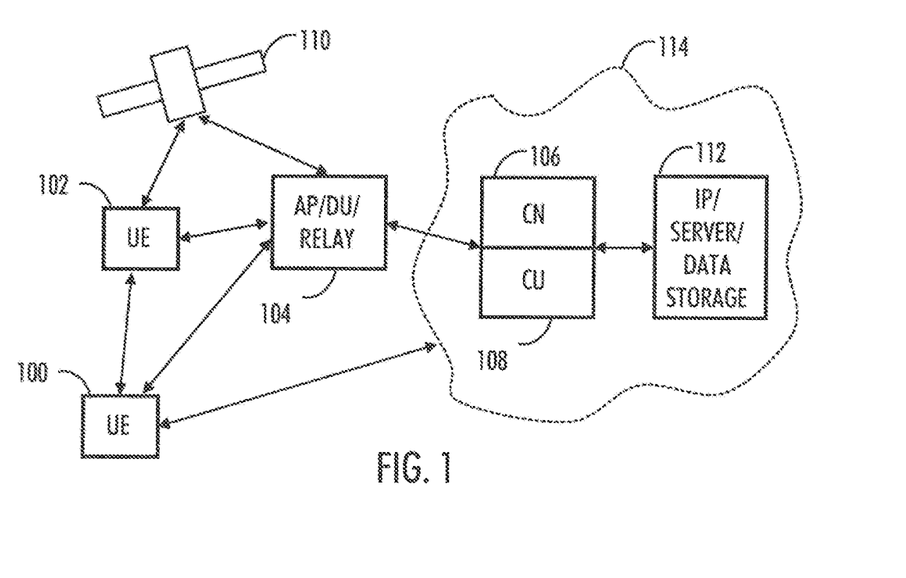
FIG. 1 illustrates an example of a communication environment where some embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for data and signaling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 106 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), User Plane Function (UPF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user device may also be a device having capability to operate utilizing enhanced machine-type communication (eMTC). The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, perhaps more base stations or nodes than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, above 6 GHz-mmWave). As mentioned, one of the concepts considered to be used in 5G networks is network slicing in which multiple independent and dedicated virtual sub-networks (network instances) may be created within the same infrastructure.

The current architecture in LTE networks is fully distributed in the radio and fully centralized in the core network. The low latency applications and services in 5G require to bring the content close to the radio which leads to local break out and mobile edge computing, (MEC). 5G enables analytics and knowledge generation to occur at the source of the data. This approach requires leveraging resources that may not be continuously connected to a network such as laptops, smartphones, tablets and sensors. Mobile edge computing provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned, radio access network may be split into two logical entities called Central Unit (CU) and Distributed Unit (DU). In prior art, both CU and DU supplied by the same vendor. Thus, they are designed together and interworking between the units is easy. The interface between CU and DU is currently being standardized by 3GPP and it is denoted F1 interface. Therefore, in the future the network operators may have the flexibility to choose different vendors for CU and DU. Different vendors can provide different failure and recovery characteristics for the units. If the failure and recovery scenarios of the units are not handled in a coordinated manner, it will result in inconsistent states in the CU and DU (which may lead to subsequent call failures, for example). Thus there is a need to enable the CU and DU from different vendors to coordinate operation to handle failure conditions and recovery, taking into account the potential differences in resiliency capabilities between the CU and DU.

As mentioned above, network slicing is a concept where network resources of an end-to-end connection between a user terminal and another end point in a public land mobile network (PLMN) are sliced. Similar network slicing may be employed also in private networks. A network slice may be understood as a logical end-to-end network that can be dynamically created and/or modified. The network(s) between the end devices may all be sliced from one end device to the other end device, the slices thus forming logical pipelines within the network(s). User terminal may access a slice over a radio interface. Each pipeline/slice may serve a particular service type. So far, three different network slice/service types have ben been standardized: eMBB (slice suitable for the handling of 5G enhanced Mobile Broadband), URLLC (slice suitable for the handling of Ultra-Reliable Low Latency Communications) and MIoT (slice suitable for the handling of massive Internet of Things). Communications Service Providers (CSPs) are able to define additional network slice/service types if needed. A given user terminal may access to multiple slices over the same Access Network (over the same radio interface, for example).

Thus, network slicing enables a communications service provider to provide dedicated virtual networks over a common network infrastructure. The different virtual or logical networks may be designed to provide different networking characteristics such as different qualities of service (QoS). For example, the virtual networks may be customized to meet specific needs of various applications, services, devices, customers and/or operators.

In a system where network slicing is utilized, a single physical network or a group of networks is sliced into multiple virtual networks (slices) that can support different radio access networks (RANs) or different service types running across a single RAN. The network slicing may be used to partition a core network of a cellular communication system such as a 5G system, but it may also be implemented in the RAN such as the WLAN.

Each network slice may be optimized to provide resources and network topology for the specific service and traffic that will use the slice. Network resources may be allocated according to requirements in terms of mobility, capacity, connectivity and coverage such that particular demands of each use case will be met. Physical network components or resources may be shared across different network slices.

The slices supported by nearby base stations or access nodes may vary. In the existing mobility procedure, the handover of a user terminal from a source base station to a target base station is initiated only based on the measurement report received from the user terminal. However, slice aware admission and load status of the target base station is not being evaluated by the source base station before the initiation of handover request. Hence there is a possibility of a rejection of handover by the target base station based on slice or resource availability.

In an embodiment of the invention, selection of handover target base station is performed not only based on the user terminal measurement report but also for slice availability and congestion status for the specific slice. This will help to find the best suitable neighbour cell based on the slices.

Figure 2:
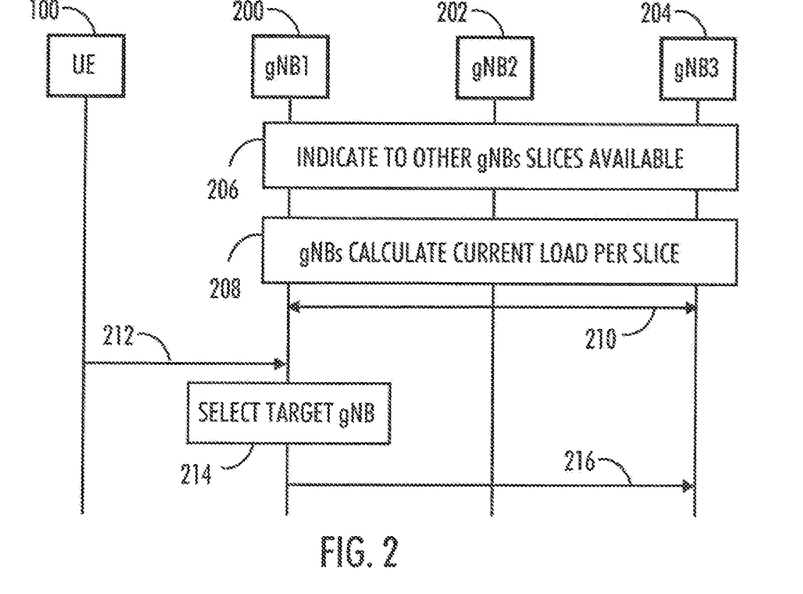
FIG. 2 is a signalling chart illustrating an embodiment.
Figure 3:
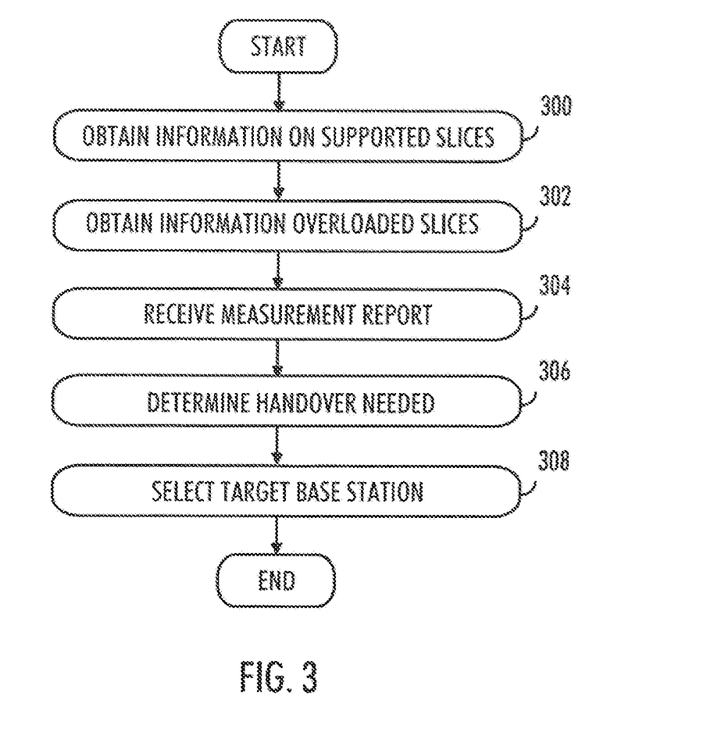
FIG. 3 is a flowchart illustrating an embodiment.
Figure 4:
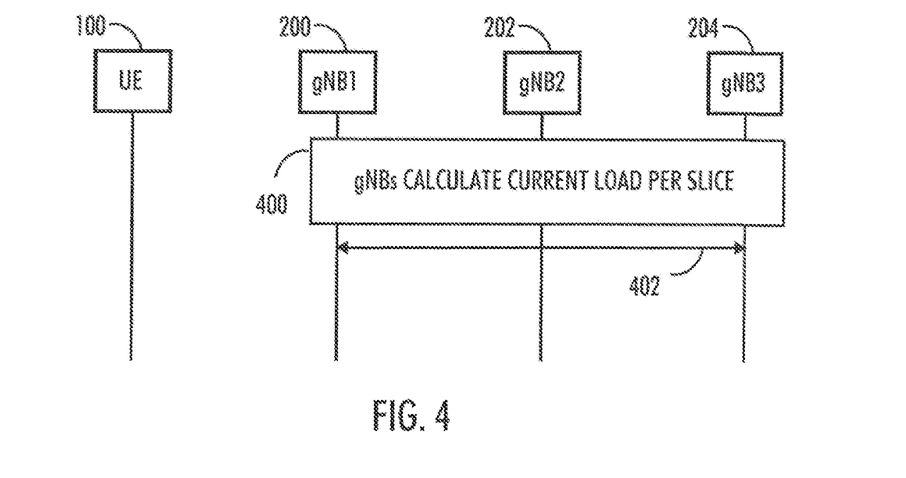
FIG. 4 is a signalling chart illustrating an embodiment.

FIG. 2 is a signalling chart illustrating an embodiment, FIG. 3 is a flowchart illustrating the operation of a source gNB and FIG. 4 is a flowchart illustrating the operation of a gNB in general in an embodiment.

FIG. 2 illustrates an example where a user terminal 100 is connected to a gNB1 200. The user terminal utilises slices in communication. In this simplified example there are two nearby gNBs, gNB2 202 and gNB3 204.

In phase 206, the gNBs are configured to indicate to other gNBs slices supported by the gNBs. In an embodiment, the gNBs obtain the information from NG-RAN Node configuration Update-message.

In phase 208, the gNBs are configured to determine current load per slice.

The gNBs are configured to determine indicate to other gNBs if there are slices that have overload, i.e. lack of resources to receive new connections. In this example, gNB2 202 has overload on a slice. The gNB2 indicates 210 the overload to gNB1 200 and gNB3 204.

The user terminal 100 transmits 212 a measurement report to the gNB1 200. The measurement report may comprise Reference Signal Received Power, RSRP, Reference Signal Received Quality, RSRQ and/or Signal-to-Interference-plus-Noise Ratio, SINR, measurements performed by the user terminal regarding the source gNB1 and nearby gNBs.

Based on the measurement report the source gNB1 200 determines in this example that a handover is needed for the user terminal 100.

In phase 214, the gNB1 200 is configured to determine the target gNB for the handover. In an embodiment, the gNB1 200 is configured to select from the surrounding base stations a target base station for handover based on the measurement report, slices supported by the base stations and the information on overloaded slices.

In this example, the source gNB1 selects gNB3 as the target gNB because gNB2 has indicated that it had overload. The source gNB1 transmits a handover request message 216 to the gNB3.

Let us study an embodiment a bit closer referring to FIG. 3. FIG. 3 illustrates examples of the operation of an apparatus or a network element configured to control handover of user terminals In an embodiment, FIG. 4 illustrates the operation of gNB or a part of an gNB.

In step 300 of FIG. 3, the apparatus is configured to obtain information on slices supported by surrounding base stations. In an embodiment, the apparatus obtains the information from NG-RAN Node configuration Update-message.

In step 302 of FIG. 3, the apparatus is configured to obtain information on overloaded slices used by the surrounding base stations. In an embodiment, the apparatus may receive messages from surrounding base stations via Xn interface. In an embodiment, the apparatus may receive messages from surrounding base stations via Core Access and Mobility Management Function, AMF, of the communication system, which is a control plane core connector for radio access network and can be seen from this perspective as the 5G version of Mobility Management Entity, MME, in LTE.

In step 304 of FIG. 3, the apparatus is configured to receive a measurement report from a user terminal utilizing slices in communication. As mentioned, the measurement report may comprise RSRP, RSRQ and/or SINR, measurements performed by the user terminal regarding the source gNB1 and nearby gNBs, for example.

In step 306 of FIG. 3, the apparatus is configured to determine, based on the measurement report, that a handover is needed for the user terminal. The signal quality reported from a surrounding gNB may be better than that the source gNB may offer, for example.

In step 308 of FIG. 3, the apparatus is configured to select from the surrounding base stations a target base station for handover based on the measurement report, slices supported by the base stations and the information on overloaded slices.

As a numeric example, referring to FIG. 2, RSRP of gNB2 may be −44 dB and RSRP of gNB3 may be −60 dB. However, gNB2 has reported eMMB slice load to be over a given overload limit, for example 90%, whereas gNB3 has not reported overload. In this example, gNB1 may select gNB3 as the target gNB for handover, as it has resources available whereas gNB2 has not, in spite of gNB2 having better RSRP than gNB3. The trade-off between RSRP and load status can be decided based on the history of RSRP range required for specific slice, for example.

In an embodiment, if in the surrounding base stations only one is acceptable based on the measurement report, that base station may be selected as the target base station.

In an embodiment, if in the surrounding base stations more than one is acceptable based on the measurement report, the source gNB may select as a target base station the base station offering maximum number of non-overloaded slices required by the user terminal.

In an embodiment, the source gNB may receive from surrounding base stations indication of slices supported by the base stations that have load exceeding a given first overload limit.

In an embodiment, the source gNB may receive from surrounding base stations indication of slices that previously had load exceeding a given first overload limit have load reduced below a given second overload limit. This is illustrated in FIG. 4, which may be a continuation to the example of FIG. 2, where gNB2 reported a slice having overload. In phase 400, the gNBs are configured to determine current load per slice. In this example, gNB2 202 determines that the load of the given slice which previously had overload, has reduced below a given limit. Now gNB2 indicates 402 to other gNBs, that the slice has no longer a overload situation.

Figure 5:
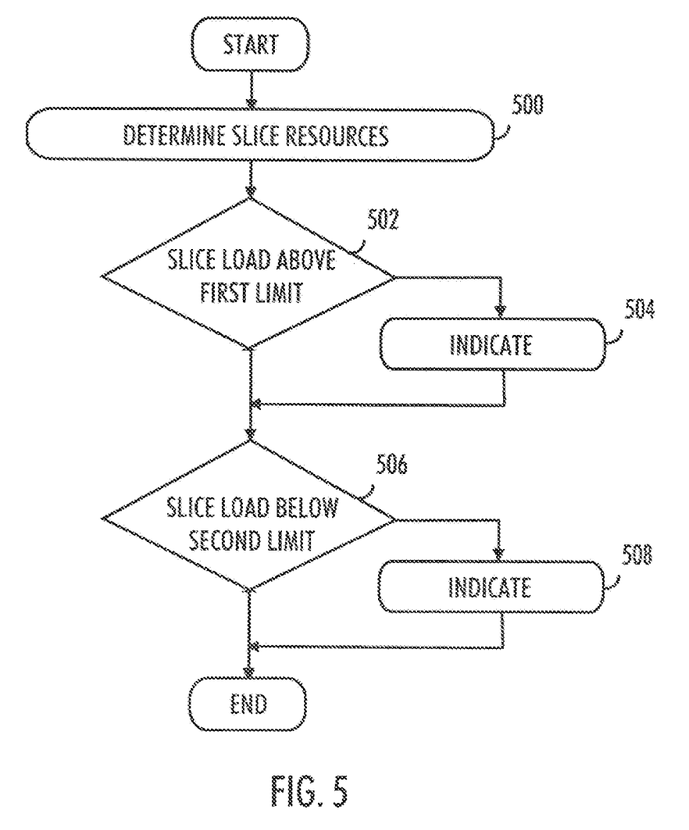
FIG. 5 is a flowchart illustrating an embodiment.

FIG. 5 is a flowchart illustrating an embodiment. FIG. 5 illustrates examples of the operation of an apparatus or a network element. In an embodiment, FIG. 5 illustrates the operation of gNB or a part of an gNB.

In step 500 of FIG. 5, the apparatus is configured to determine the resource availability of the slices the apparatus is supporting.

In step 502 of FIG. 5, the apparatus is configured to determine if one or more slices have load exceeding a given overload limit.

If so, the apparatus is configured to, in step 504, indicate to surrounding base stations that one or more slices have load exceeding a given overload limit.

In step 506 of FIG. 5, the apparatus is configured to determine if one or more slices that previously had load exceeding a given overload limit have load fallen below a given second overload limit.

If so, the apparatus is configured to, in step 508, indicate to surrounding base stations that one or more slices that previously had load exceeding a given overload limit have load fallen below a given second overload limit.

In an embodiment, the first and second overload limits are received from the communication system. In an embodiment, the operator of the communication system can define the limits for the slice resource in terms of bandwidth usage, number of Packet Data Unit, PDU, sessions, number of flows or even processor/buffer memory usage, for example. Load exceeding the first overload limit denotes that a slice has an overload, and load dropping below the second overload limit denotes the end of overload. Typically, to avoid frequent indication messages, the first overload limit is larger than the second overload limit. For example, the first overload limit may be 90% and the second overload limit may be 80%. These non-limiting numerical values are for illustrative purposes only.

The procedure described in FIG. 5 may be continuous or performed at given time intervals. As soon as overload or end of overload is detected it may be indicated to surrounding gNBs.

Figure 6:
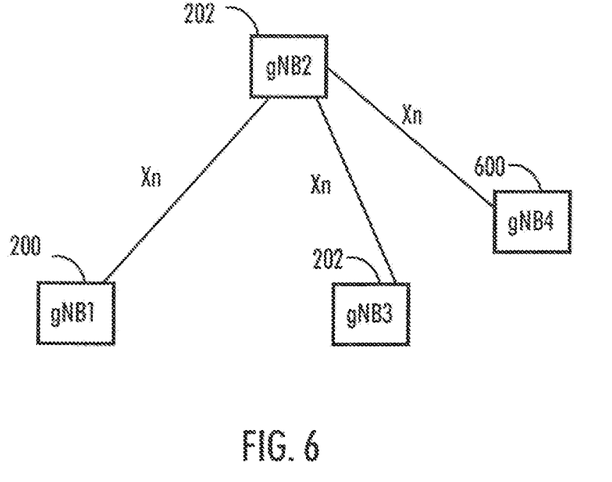
FIGS. 6 and 7 illustrate examples of connections between base stations.

FIG. 6 illustrates an embodiment. FIG. 6 shows four gNBs 100, 200, 202, 600. The gNB2 202 determines load of supported slices. In the example of FIG. 6, gNB2 202 utilises an Xn control message to indicate overload or end of overload. The Xn control message will be broadcasted to all the Xn neighbors.

Figure 7:
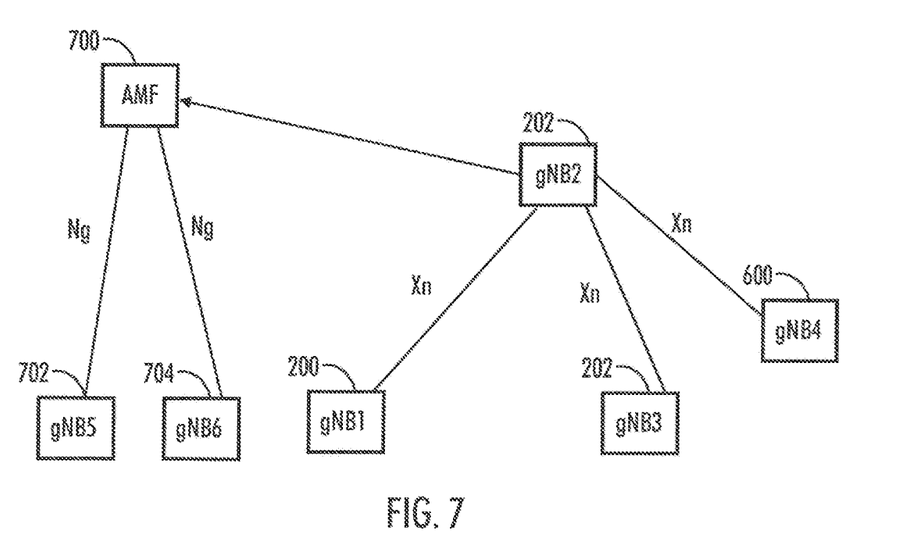

FIG. 7 illustrates another embodiment. FIG. 7 shows six gNBs 100, 200, 202, 600, 702 and 704. Part of the gNBS are connected to gNB 202 with Xn interface, part of the gNBs are connected to Core Access and Mobility Management Function, AMF 700, of the communication system. The gNB2 202 determines load of supported slices. In the example of FIG. 7, gNB2 broadcasts Xn control message to all the Xn neighbors 100, 200, 202, 600 and to AMF 700. The AMF 700 can in turn broadcast the message to all the gNBs 702, 704 in the (slice)registration area.

Figure 8:
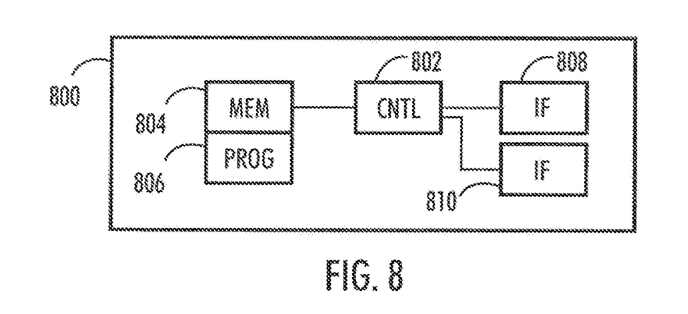
FIG. 8 illustrates an example of an apparatus employing some embodiments of the invention.

FIG. 8 illustrates an embodiment. The figure illustrates a simplified example of an apparatus applying embodiments of the invention. In some embodiments, the apparatus may be a gNB, or any other entity or network element of the communication system provided that the necessary inputs are available and required interfaces exists to transmit and receive required information.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 800 of the example includes a control circuitry 802 configured to control at least part of the operation of the apparatus. The control circuitry may be realized as a processor or more than one processors, for example.

The apparatus may comprise a memory 804 for storing data. Furthermore the memory may store software 806 executable by the control circuitry 802. The memory may be integrated in the control circuitry.

The apparatus may comprise one or more interface circuitries 808, 810. The interface(s) may connect the apparatus to other network elements of the communication system. The interface(s) may provide a wired or wireless connection to the communication system. The interface(s) may be operationally connected to the control circuitry 802.

The software 806 may comprise a computer program comprising program code means adapted to cause the control circuitry 802 of the apparatus to perform the embodiments described above and in the claims.

In an embodiment, the apparatus comprises at least one processor or control circuitry 802 and at least one memory 804 including a computer program code 806, wherein the at least one memory and the computer program code are configured, with the at least one processor, to cause the apparatus to carry out the functionalities of the apparatus 800 according to any one of the embodiments of described above and in the claims.

According to an aspect, when the at least one processor or control circuitry 802 executes the computer program code, the computer program code causes the apparatus to carry out the functionalities according to any one of the embodiments described above and in the claims.

According to another embodiment, the apparatus comprises the at least one processor or control circuitry 802 and at least one memory 804 including a computer program code 806, wherein the at least one processor or control circuitry 802 and the computer program code 806 perform the at least some of the functionalities of the apparatus 800 according to any one of the embodiments described above and in the claims. Accordingly, the at least one processor or control circuitry 802, the memory, and the computer program code form processing means for carrying out some embodiments of the present invention in the apparatus 800.

In an embodiment, the apparatus comprises means for obtaining information on slices supported by surrounding base stations; means for obtaining information on overloaded slices used by the surrounding base stations; means for receiving a measurement report from a user terminal utilizing slices in communication; means for determining based on the measurement report that a handover is needed for the user terminal and means for selecting from the surrounding base stations a target base station for handover based on the measurement report, slices supported by the base stations and the information on overloaded slices.

In an embodiment, the apparatus comprises means for determining the resource availability of the slices the apparatus is supporting, means for indicating to surrounding base stations if one or more slices have load exceeding a given first overload limit; and means for indicating to surrounding base stations if one or more slices that previously had load exceeding a given overload limit has load fallen below a given second overload limit.

In an embodiment, the processes or methods described in above figures may also be carried out in the form of one or more computer processes defined by one or more computer program. A separate computer program may be provided in one or more apparatuses that execute functions of the processes described in connection with the figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits, ASICs. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system, the apparatus comprising:
at least one processor;
at least one memory including computer program code;

the at least one memory and the computer program code configured to, with the at least one processor, cause the apparatus at least to:

obtain information on slices supported by surrounding base stations;

obtain information on overloaded slices used by the surrounding base stations;

receive, from the surrounding base stations, indications of slices that previously had load exceeding a given first overload limit and have load reduced below a given second overload limit;

receive, after the obtaining information on slices, a measurement report from a user terminal utilizing slices in communication;

determine based on the measurement report that a handover is needed for the user terminal;

select from the surrounding base stations a target base station for handover based on the measurement report, slices supported by the base stations and the information on overloaded slices, wherein if in the surrounding base stations more than one is acceptable based on the measurement report, select as a target base station the base station offering maximum number of non-overloaded slices required by the user terminal.

2. The apparatus of claim 1, the at least one memory and the computer program code configured to, with the at least one processor, cause the apparatus further to:

receive from surrounding base stations indication of slices supported by the base stations that have load exceeding a given first overload limit.

3. The apparatus of claim 1, the at least one memory and the computer program code configured to, with the at least one processor, cause the apparatus further to:

if in the surrounding base stations only one is acceptable based on the measurement report, select that base station as the target base station.

4. A method in a communication system, comprising:

obtaining information on slices supported by surrounding base stations;

obtaining information on overloaded slices used by the surrounding base stations;

receiving, from the surrounding base stations, indications of slices that previously had load exceeding a given first overload limit and have load reduced below a given second overload limit;

receiving, after the obtaining information on slices, a measurement report from a user terminal utilizing slices in communication;

determining based on the measurement report that a handover is needed for the user terminal;

selecting from the surrounding base stations a target base station for handover based on the measurement report, slices supported by the base stations and the information on overloaded slices, wherein if in the surrounding base stations more than one is acceptable based on the measurement report, select as a target base station the base station offering maximum number of non-overloaded slices required by the user terminal.

5. The method of claim 4, further comprising:

receiving from surrounding base stations indication of slices supported by the base stations that have load exceeding a given first overload limit.

6. A computer program embodied on a non-transitory computer-readable medium, said computer program comprising instructions for causing an apparatus of a communication system to perform at least the following:

obtaining information on slices supported by surrounding base stations;

obtaining information on overloaded slices used by the surrounding base stations;

receiving, from the surrounding base stations, indications of slices that previously had load exceeding a given first overload limit and have load reduced below a given second overload limit;

receiving, after the obtaining information on slices, a measurement report from a user terminal utilizing slices in communication;

determining based on the measurement report that a handover is needed for the user terminal;

selecting from the surrounding base stations a target base station for handover based on the measurement report, slices supported by the base stations and the information on overloaded slices, wherein if in the surrounding base stations more than one is acceptable based on the measurement report, select as a target base station the base station offering maximum number of non-overloaded slices required by the user terminal.

* * * * *